US008913972B2

(12) United States Patent
Luz et al.

(10) Patent No.: US 8,913,972 B2
(45) Date of Patent: Dec. 16, 2014

(54) ANTENNA CLUSTERING FOR MULTI-ANTENNA APERTURE SELECTION

(71) Applicant: Nokia Siemens Networks Oy, Espoo (FI)

(72) Inventors: Yehuda Luz, Buffalo Grove, IL (US); Philip Fleming, Glen Ellyn, IL (US); Shirish Nagaraj, Hoffman Estates, IL (US)

(73) Assignee: Nokia Siemens Networks Oy, Espoo (FI)

(*) Notice: Subject to any disclaimer, the term of this patent is extended or adjusted under 35 U.S.C. 154(b) by 0 days.

(21) Appl. No.: 13/649,484

(22) Filed: Oct. 11, 2012

(65) Prior Publication Data

US 2014/0106695 A1    Apr. 17, 2014

(51) Int. Cl.
    *H04B 1/04*    (2006.01)
(52) U.S. Cl.
    USPC ............. 455/127.1; 455/453; 455/127.3; 455/67.11; 455/121
(58) Field of Classification Search
    CPC ............................. H04W 16/24; H04B 1/3888
    USPC .............. 455/127.1, 453, 127.3, 67.11, 121
    See application file for complete search history.

(56) References Cited

U.S. PATENT DOCUMENTS

| 5,751,418 A | 5/1998 | Kimura et al. |
| 6,402,739 B1 | 6/2002 | Neev |
| 6,511,475 B1 | 1/2003 | Altshuler et al. |
| 6,529,767 B1 | 3/2003 | Woo et al. |
| 7,139,539 B2 | 11/2006 | Chun .................. 455/127.1 |
| 8,088,123 B2 | 1/2012 | Kinoshita et al. .............. 606/9 |
| 2002/0173782 A1 | 11/2002 | Cense et al. |
| 2002/0183724 A1 | 12/2002 | Neev |
| 2003/0023283 A1 | 1/2003 | McDaniel .................. 607/88 |
| 2003/0032950 A1 | 2/2003 | Altshuler et al. |
| 2003/0100936 A1 | 5/2003 | Altshuler et al. |
| 2004/0167502 A1 | 8/2004 | Weckwerth et al. |

(Continued)

FOREIGN PATENT DOCUMENTS

| DE | 101 20 787 A1 | 1/2003 |
| EP | 0709974 A1 | 5/1996 |

(Continued)

OTHER PUBLICATIONS

Erik G. Larsson, "Robust Structured Interference Rejection Combining", Wireless Communications and Networking Conference, IEEE, vol. 2, pp. 922-926, 2005.

(Continued)

*Primary Examiner* — Sanh Phu
(74) *Attorney, Agent, or Firm* — Harrington & Smith

(57) ABSTRACT

The specification and drawings present a new method, apparatus and software related product for antenna clustering for multi-antenna aperture selection (MAAS), e.g., in LTE wireless systems, using multi-core DSP processing with sub-optimum selection of N out of M of antenna signals and minimizing the performance degradation due to the sub-optimal antenna/antenna signal selection. Assigning each DSP core (machine) to N/K antennas (i.e., to antenna signals) having a similar property (e.g., polarization) and a same tier, the selection of N out of M using a predefined criterion (e.g., best SINR) is reduced to selecting N/K out of M/K which reduces the computation complexity by a factor of K, where K is a number of the DSP cores.

21 Claims, 8 Drawing Sheets

(56) References Cited

U.S. PATENT DOCUMENTS

| | | |
|---|---|---|
| 2006/0041289 A1 | 2/2006 | Cense et al. |
| 2006/0223450 A1* | 10/2006 | Dacosta .................... 455/73 |
| 2007/0093797 A1 | 4/2007 | Chan et al. ............... 606/12 |
| 2007/0093798 A1 | 4/2007 | DeBenedictis et al. ......... 606/12 |
| 2007/0255355 A1 | 11/2007 | Altshuler et al. ............. 607/86 |
| 2008/0152030 A1* | 6/2008 | Abramov et al. ............ 375/260 |
| 2008/0300004 A1 | 12/2008 | Balachandran et al. ...... 455/522 |
| 2008/0319430 A1 | 12/2008 | Zenzie et al. ................... 606/9 |
| 2009/0027260 A1* | 1/2009 | Runyon et al. ............... 342/352 |
| 2009/0075618 A1 | 3/2009 | Ghassemzadeh et al. . 455/277.1 |
| 2009/0287195 A1 | 11/2009 | Altshuler et al. ................ 606/9 |
| 2010/0002657 A1 | 1/2010 | Teo et al. .................... 370/336 |
| 2010/0027456 A1 | 2/2010 | Onggosanusi et al. ....... 370/312 |
| 2010/0056215 A1 | 3/2010 | Gorokhov et al. ........... 455/561 |
| 2010/0144334 A1 | 6/2010 | Gorokhov et al. ........... 455/418 |
| 2010/0232336 A1 | 9/2010 | Choudhury et al. .......... 370/312 |
| 2010/0265813 A1 | 10/2010 | Pereira et al. ................ 370/201 |
| 2010/0323611 A1 | 12/2010 | Choudhury ....................... 455/7 |
| 2011/0080879 A1 | 4/2011 | Grant ........................... 370/329 |
| 2011/0202115 A1 | 8/2011 | Kinoshita et al. .............. 607/88 |
| 2011/0275397 A1 | 11/2011 | Guey et al. ................... 455/509 |
| 2011/0281591 A1 | 11/2011 | Wang et al. ............... 455/452.2 |
| 2011/0287791 A1 | 11/2011 | Fujishima et al. ........... 455/500 |
| 2012/0002750 A1 | 1/2012 | Hooli et al. .................. 375/295 |
| 2012/0114050 A1 | 5/2012 | Osterling ..................... 375/259 |
| 2012/0134279 A1 | 5/2012 | Tamaki ........................ 370/248 |
| 2012/0149411 A1 | 6/2012 | Miyoshi et al. .............. 455/501 |
| 2012/0224541 A1 | 9/2012 | Yoshiuchi et al. ........... 370/329 |
| 2012/0314665 A1* | 12/2012 | Ishida et al. ................. 370/329 |
| 2013/0021925 A1 | 1/2013 | Yin et al. ..................... 370/252 |
| 2013/0040671 A1 | 2/2013 | Zawaideh et al. ............ 455/500 |
| 2013/0136068 A1 | 5/2013 | Johansson et al. ........... 370/329 |
| 2013/0142054 A1 | 6/2013 | Ahmadi ....................... 370/252 |
| 2013/0170574 A1 | 7/2013 | Fleming et al. .............. 375/267 |
| 2013/0172050 A1 | 7/2013 | Fleming et al. ............ 455/562.1 |

FOREIGN PATENT DOCUMENTS

| | | |
|---|---|---|
| EP | 1133205 A2 | 9/2001 |
| EP | 1954075 A1 | 8/2008 |
| EP | 2 197 221 A1 | 6/2010 |
| EP | 2381587 A1 | 10/2011 |
| EP | 2541823 A1 | 1/2013 |
| GB | 2367984 A | 4/2002 |
| JP | 1-299488 A | 12/1989 |
| JP | 3066394 U | 2/2000 |
| JP | 2002-177405 A | 6/2002 |
| JP | 2004-45038 A | 2/2004 |
| KR | 100785105 B1 | 12/2007 |
| WO | WO-02/085229 A2 | 10/2002 |
| WO | WO-02/094116 A1 | 11/2002 |
| WO | WO-2005/110266 A2 | 11/2005 |
| WO | WO-2009036636 A1 | 3/2009 |

OTHER PUBLICATIONS

Gesbert et al., "Shifting the MIMO Paradigm", IEEE Signal Processing Magazine, pp. 36-46, Sep. 2007.

Marsch, et al., "Field Trial Results on Different Uplink Coordinated Multi-Point (CoMP) Concepts n Cellular Systems", 2010 International ITG Workshop on Smart Antennas (WSA), 6 pgs., Feb. 23-24, 2010.

Parkvall et al., "LTE-Advanced-Evolving LTE towards IMT-Advanced", IEEE Vehicular Technology Conference, 5 pgs., 2008.

Parkvall et al., "The Evolution of LTE towards IMT-Advanced", Journal of Communications, vol. 4, No. 3, 9 pgs., Apr. 2009.

Quek, et al., "Uplink Coordinated Multi-Point ARQ in MIMO Cellular Systems", The Institute of Electronics, Information and Communication Engineers, IEICE Trans., Commun., vol. E94-B, No. 12, pp. 3211-3224, Dec. 2011.

Nokia Siemens Networks, "Liquid Radio, Let traffic waves flow most efficiently", www.nokiasiemensnetworks.com/file/13456/liquid-radio?download; Feb. 6, 2012, 12 pgs.

Zheng, et al., "Uplink Coordinated Multi-Point for LTE-A in the Form of Macro-Scopic Combining", IEEE Vehicular Technology Conference (VTC), 5 pgs., 2010.

Jolly Parikh, "LTE Advanced: The 4G Mobile Broadband Technology", International Journal of Computer Applications, vol. 13, No. 5, pp. 17-21, Jan. 2011.

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0, 101 pgs., Dec. 2011.

Boccardi, Federico, et al., "Network MIMO with reduced backhaul requirements by MAC coordination", IEEE 2008, pp. 1125-1129.

Falconetti, Laetitia, et al., "Distributed Uplink Macro Diversity for Cooperating Base Stations", IEEE 2009, 5 pgs.

* cited by examiner

ANTENNA CLUSTERING FOR MULTI-ANTENNA APERTURE SELECTION

TECHNICAL FIELD

The exemplary and non-limiting embodiments of this invention relate generally to wireless communications and more specifically to antenna clustering for multi-antenna aperture selection (e.g., in LTE wireless systems).

BACKGROUND ART

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP third generation partnership project
AMU antenna management unit
ASIC application specific integrated circuit
BBU baseband unit
CDMA code division multiple access
CPRI common public radio interface
DL downlink (from base station to UE)
DRAN dense RAN
DSP digital signal processor
FDD frequency division duplex
FDM frequency division multiplexing
ID identification
I/F interface
IRC interference rejection combining
LTE long term evolution
LTE-A long term evolution advanced
MAAS multi-antenna aperture selection
Mbps megabits per second
MHz mega-Hertz
MIMO multiple input multiple output
MU multi user
MIPS microprocessor without interlocked pipeline stages
OBSAI open base station architecture initiative
RF radio frequency
RAN radio access network
DRAN dense RAN
RRH remote radio head or remote RF head
SINR signal-to-interference noise ratio
SRS sounding reference signals
TDM time division multiplexing
UE user equipment
UL uplink (from UE to base station)

In places with a very high density of data subscribers in a wireless system, it is difficult for the operator of the system to provide an adequate data rate to each subscriber. For example, in a stadium sporting event, there can be many thousands of spectators. Spectators can be as dense as 1.5 per square meter. Suppose half of the spectators are subscribers to a given wireless service and one percent of those are asking for a download or upload simultaneously. This is admittedly a "peak" scenario but not too extreme. If the users expect a 1 Mbps (megabits per second) data rate, a cell (typically 10 Mbps/cell downlink for 10 MHz FDD-LTE) would be able to support about 200 spectators seated in an area of 133 square meters. Note that 133 square meters is roughly the area of a circle of radius 6.5 m. With cells packed this densely, cell-edge effects become dominant.

Even provided with many low power antennas and corresponding receivers and/or transmitters, a wireless system can be easily overwhelmed by this amount of traffic. Conversely, increasing capacity through additional hardware can be expensive or impossible. It would be beneficial to provide the ability to use currently installed hardware to improve wireless capacity.

SUMMARY

According to a first aspect of the invention, a method comprising: receiving by a processing device M signals, each of the M signals being detected by one of M antennas of a plurality of network elements from a user equipment, where each network element has two or more antennas; processing by the processing device separately multiple groups of signals formed from the received M signals to select one or more signals in each group by excluding at least one signal, wherein each group of the multiple groups comprises two or more signals of the M signals; and combining by the processing device all selected signals from the multiple groups of signals to represent a signal transmitted by the user equipment.

According to a second aspect of the invention, an apparatus comprising: a processing system comprising at least one processor and a memory storing a set of computer instructions, in which the processing system is arranged to cause the apparatus to: receive M signals, each of the M signals being detected by one of M antennas of a plurality of network elements from a user equipment, where each network element has two or more antennas; process separately multiple groups of signals formed from the received M signals to select one or more signals in each group by excluding at least one signal, wherein each group of the multiple groups comprises two or more signals of the M signals; and combine all selected signals from the multiple groups of signals to represent a signal transmitted by the user equipment.

BRIEF DESCRIPTION OF THE DRAWINGS

For a better understanding of the nature and objects of embodiments of the invention, reference is made to the following detailed description taken in conjunction with the following drawings, in which.

DETAILED DESCRIPTION

Joint detection using neighboring cells cooperation can be used for improving LTE uplink signal detection/performance. Antenna selection of N out of M can improve the uplink performance in LTE cellular networks. This advantage may become useful in very dense RAN (DRAN) deployment including stadium during sports events and in airports where density is higher than 1.5 users/square-meter.

Figure 1:
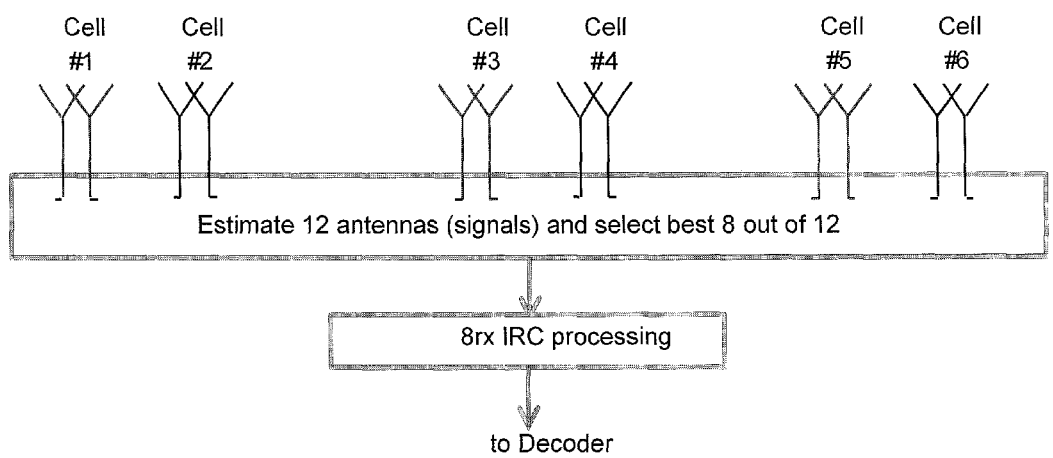
FIG. 1 is an exemplary diagram for selecting best 8 out of 12 antenna signals with subsequent IRC combining/processing for 6 cells each having cross-pole antennas using MAAS algorithm.

For example, simulation with selecting signals from 8 antennas (N=8) out of total signals from 12 antennas (M=12) show a significant gain in cell edge and even more gain in overall stadium throughput. But the processing power required for implementing such DRAN applications may exceed the state of the art DSP processors which are available today. Especially if N and M are large, the MIPS requirements for implementing a true full selection of 8 out of 12 candidates may become non-practical, as shown for example in FIG. 1. FIG. 1 demonstrate selecting best 8 out of 12 antenna signals (6 cells) with subsequent IRC combining/processing for 8 selected signals.

Figure 2:
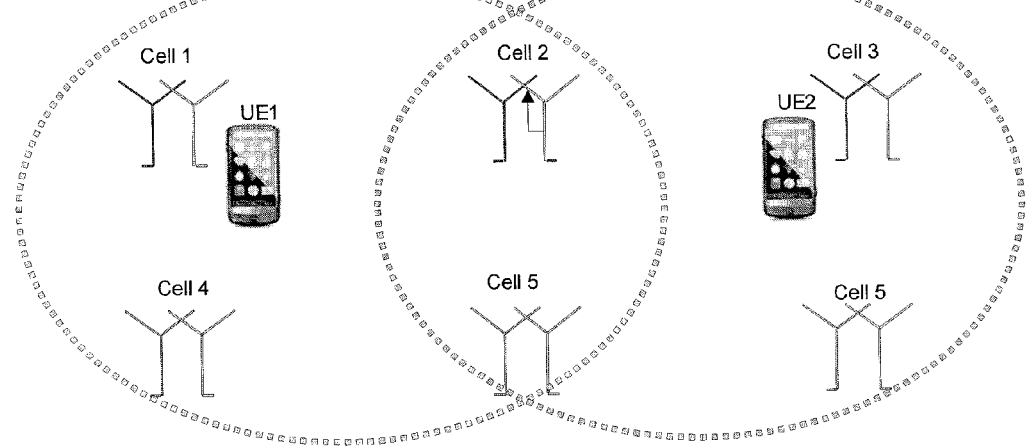
FIG. 2 is an example for selecting best 8 out of 12 antenna signals for 2 UEs using MAAS algorithm based on pathloss measurements.

Selection of sub-group of N=8 out of a cluster of M=12 can be performed in real time per user as shown in FIG. 2. In this diagram we assume that the user UE1 is attached to cell 1 and the user UE2 is attached to cell 3. Using the UL multi-antenna aperture selection (MAAS) algorithm one of the two sub-groups based on the specific UE path loss measurement can be selected. Then the user UE1 UL signal may be processed by its best 8 antennas (cell 1+cell 2+cell 4+cell 5), and the user UE2 UL signal can be processed by its best 8 antennas (Cell 2+Cell 3+Cell 5+Cell 6). However, if the processing is performed according to the procedure shown in FIG. 1, it will require a significant processing power and may become non-practical especially for large N and M.

A new method, apparatus, and software related product (e.g., a computer readable memory) are presented for antenna clustering for multi-antenna aperture selection (MAAS), e.g., in LTE wireless systems, using multi-core DSP processing with sub-optimum selection of N out of M of antenna signals and minimizing the performance degradation due to the sub-optimal antenna/antenna signal selection. According to an embodiment of the invention, assigning each DSP core (machine) to N/K antennas (i.e., to antenna signals) having a similar property (e.g., polarization) and a same tier, the selection of N out of M using a predefined criterion (e.g., best SINR) is reduced to selecting N/K out of M/K which reduces the computation complexity by a factor of K, where K is a number of the DSP cores. The further definition, as described herein, of the same/similar antenna property such as antenna polarization and the same tier per core may guarantee that the sub-optimal solution can have similar performance as the full selection of N out of M does.

Thus according to an exemplary embodiment, a processing device such as BBU may receive M signals from a plurality network elements (directly from network elements such as RRHs or indirectly from the RRHs through other processing devices such as BBUs), each of the M signals was detected by one of M antennas of the plurality of the network elements from a UE, where each network element has two or more antennas. Then the processing device (BBU) can process separately multiple groups of signals formed from the received M signals to select one or more signals in each group by excluding at least one signal (e.g., selecting best 2 out of 3), wherein each group of the multiple groups comprises two or more signals of the M signals (e.g., m1, m2, ... mk, total of K groups processed separately). In other words K each core processors select best n1 antenna signals out of m1 (n1<m1), n2 out of m2 (n2<m2), ..., nk out of mk (nk<mk). Further, the processing device (BBU) can combine (e.g., using IRC technique) all selected signals from the multiple groups of signals (e.g., N signals, N=n1+n2+ ... +nk, N<M) to represent a signal transmitted by the user equipment. For example, if M=12, K=4, m1=m2= ... =mk=3, n1=n2= ... =nk=2, then N=8.

Figure 3:
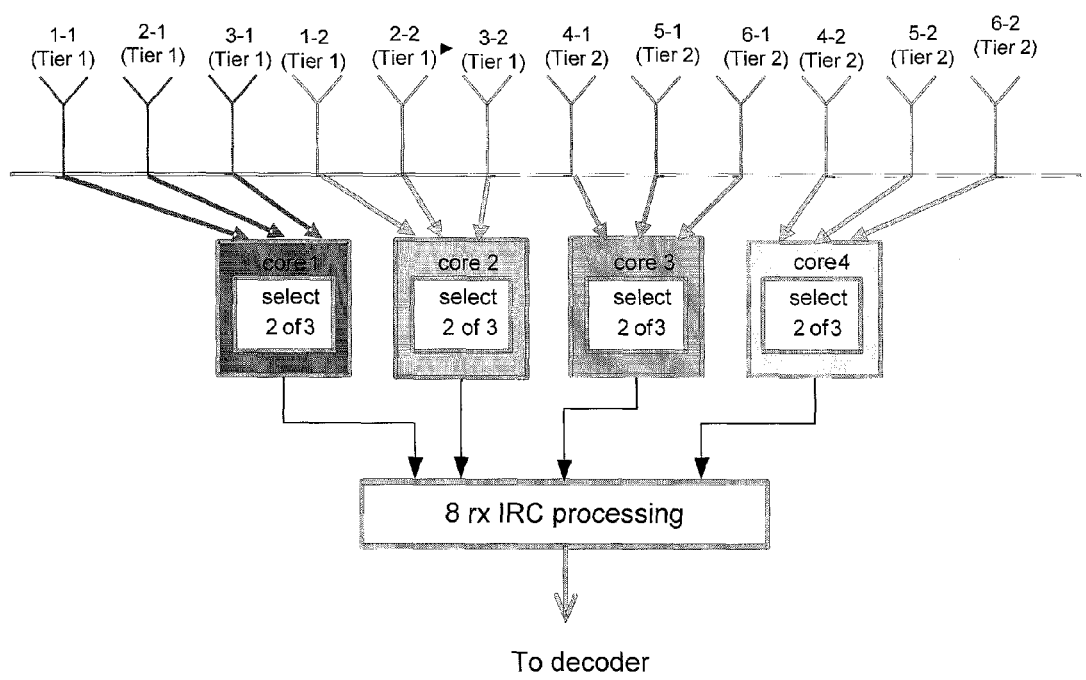
FIG. 3 is a diagram demonstrating the processing concept using 4 DSP cores, according to an exemplary embodiment of the invention.
Figure 4:
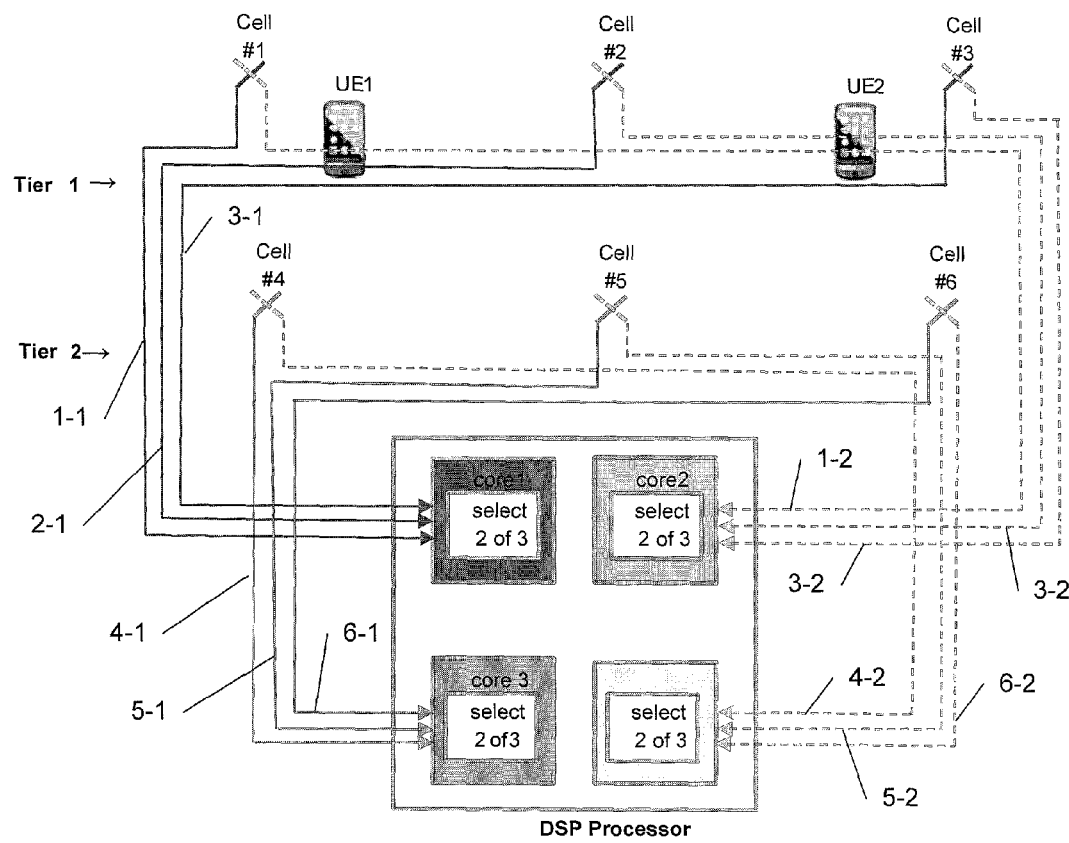
FIG. 4 is a diagram further demonstrating the processing concept using 4 DSP cores with antennas having different polarizations and using a tier approach, according to an exemplary embodiment of the invention.

FIGS. 3 and 4 demonstrate the exemplary embodiments. FIG. 3 demonstrates the processing concept by a processing device using 4 DSP cores. For N=8 and M=12 each core needs to select 2 best antennas (antenna signals) out of 3 candidates. The core 1 processes signals (which selects best 2 out of 3) from antennas 1-1, 2-1 and 3-1 of cells 1, 2 and 3 respectively with the same property (e.g., polarization) from tier one (see an example in FIG. 4 as further explained herein). The core 2 processes signals (which selects best 2 out of 3) from antennas 1-2, 2-2 and 3-2 of cells 1, 2 and 3 respectively with a different property (e.g., polarization) from tier one (see illustration in FIG. 4 as further explained herein). The core 3 processes signals (which selects best 2 out of 3) from antennas 4-1, 5-1 and 6-1 of cells 4, 5 and 6 respectively with the same property (e.g., polarization) from tier two (see illustration in FIG. 4 as further explained herein). The core 4 processes signals (which selects best 2 out of 3) from antennas 4-2, 5-2 and 6-2 of cells 4, 5 and 6 respectively with a different property (e.g., polarization) from tier two (see illustration in FIG. 4 as further explained herein). After each core selects 2 out of 3 best antennas (i.e., antenna signals), 8 chosen signals are combined using IRC processing with subsequent decoding.

FIG. 4 is complimentary to FIG. 3 and further explains the concept. According to one embodiment, we call tier one and tier two the top and bottom rings, e.g., in the stadium respectively, as shown in FIG. 4. Antenna is in tier one if it is in the top of the diagram. Other antennas are in tier two if located at the bottom of the diagram. Therefore antenna signals 1-1, 2-1, 3-1, 1-2, 2-2 and 3-2 are referred to tier one (see FIG. 3) and antenna signals 4-1, 5-1, 6-1, 4-2, 5-2 and 6-2 are referred to tier two (see FIG. 3).

Moreover, according to a further embodiment, antennas (two or more) in one cell can have different distinguishable properties or, in other words, not perfectly correlated. This may be accomplished using antennas with different polarization: for example one antenna in a cell having +45° polarization (e.g., corresponding to signals 1-1, 2-1, 3-1, 4-1, 5-1 and 6-1) and another antenna in the same cell having −45° polarization antennas (e.g., corresponding to signals 1-2, 2-2, 3-2, 4-2, 5-2 and 6-2). Other features such as different antenna configurations (e.g., uniform linear array, circular array, etc.) standalone or in addition to different polarization patterns for distinguishing antennas in one cell may be also used.

Moreover, the signals from the UE1 and UE2 shown in FIG. 4 can be distinguished by scheduling UL transmissions using different resources for the UE1 and UE2, for example based on different frequencies/subbands (FDM), using TDM and/or CDMA techniques.

Thus using the antenna clustering for MAAS shown in FIGS. 3 and 4 the following results can be generated for the UE 1 and UE2:

Core 1 will select Cell 1 and Cell 2 for UE1;
Core 2 will select Cell 1 and Cell 2 for UE1;
Core 3 will select Cell 4 and Cell 5 for UE1;
Core 4 will select Cell 4 and Cell 5 for UE1;
Core 1 will select Cell 3 and Cell 2 for UE2;
Core 2 will select Cell 3 and Cell 2 for UE2;
Core 3 will select Cell 6 and Cell 5 for UE2;
Core 4 will select Cell 6 and Cell 5 for UE2.

These results may be similar to results in reference to FIG. 2 but are achieved using multi-core processing with less amount of processing/computation.

Figure 5:
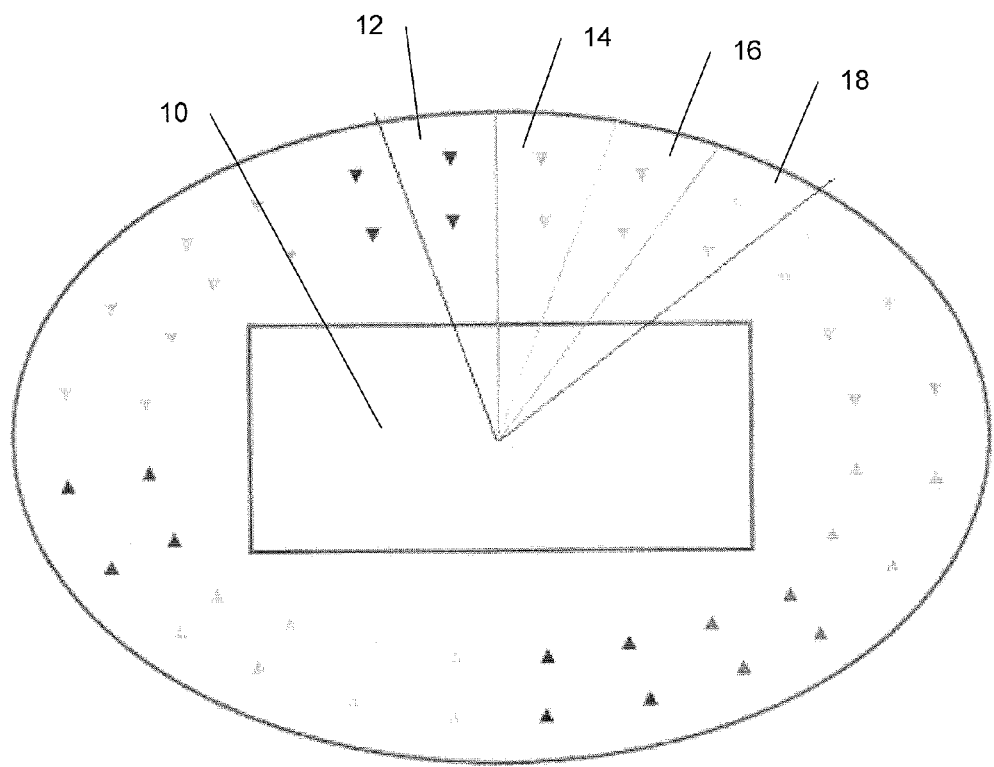
FIG. 5 is a diagram demonstrating antenna clustering for multi-antenna aperture selection with 48 cells around a stadium, according to an exemplary embodiment of the invention.

Referring now to FIG. 5, an example is presented for antenna clustering for multi-antenna aperture selection with 48 cells around a stadium 10. Each cell has 2 antennas not perfectly correlated (e.g., cross polarized) and each segment such as 12, 14, 16, 18, etc. (as shown in FIG. 5) has 2 cells and 4 antennas. Each segment is associated with one processing device such as BBU having a DSP utilizing 4-core processing according to the exemplary embodiments described herein. Thus, if a UE is associated with a cell in the segment 14, the BBU of the segment 14 can use antenna signals of the corresponding polarities and tier from the 12 antennas in the segments 12, 14 and 16 to process the corresponding antennas signals using 4-core DSP processing to select best 8 out of 12 antenna signals with subsequent IRC processing/combining and decoding as described herein. Similarly, if the UE is associated with a cell in the segment 16, the BBU of the segment 16 can use antenna signals of the corresponding polarities and tier from the 12 antennas in segments 14, 16 and 18 to process the corresponding antennas signals using 4-core DSP processing to select best 8 out of 12 antenna signals with subsequent IRC processing/combining and decoding as described herein.

Figure 6:
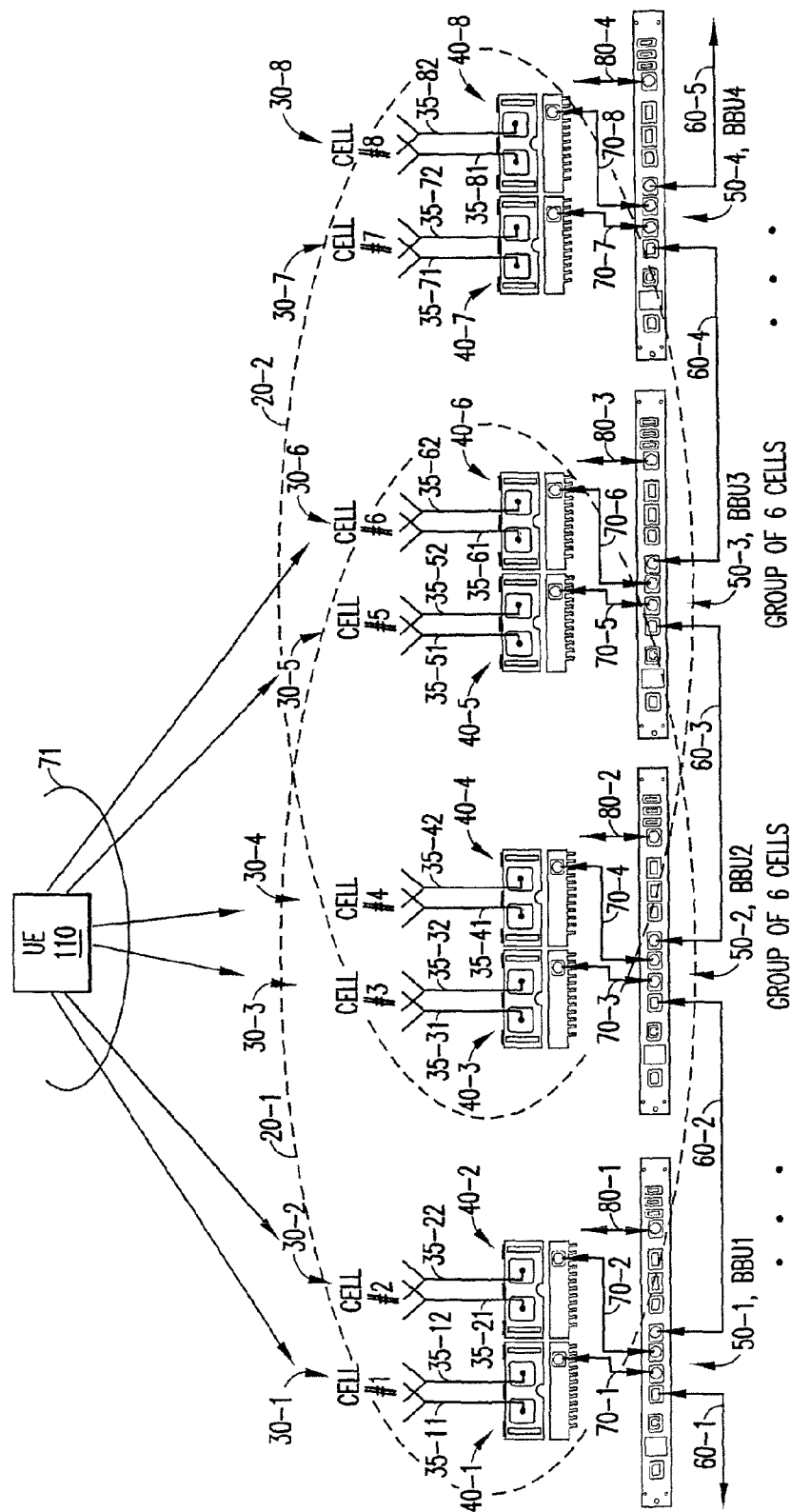
FIG. 6 is an exemplary diagram for implementing antenna clustering MAAS method using LTE electronic devices, according to an exemplary embodiment of the invention.

FIG. 6 shows an implementation example using LTE electronic devices which can be used for implementing antenna clustering MAAS method, e.g., for cells in FIG. 5. The segment 12 of FIG. 5 may correspond to cells 1 and 2 in FIG. 6, the segment 14 of FIG. 5 may correspond to cells 3 and 4 in FIG. 6, the segment 14 of FIG. 5 may correspond to cells 5 and 6 in FIG. 6, and the segment 148 of FIG. 5 may correspond to cells 7 and 8 in FIG. 6.

In FIG. 6 there are two groups 20-1 and 20-2 (similar to groups comprising of segments 12, 14, 16 and 14, 16, 18 in FIG. 5), each group 20 having six cells 30. Group 20-1 has cells 30-1 through 30-6, and group 20-2 has cells 30-3 through 30-8. Two-antenna cells 30 are directly connected to each baseband unit (BBU) 50 via two remote radio heads (RRHs) 40 and two links 70. Links 70 may implement, e.g., an open base station architecture initiative (OBSAI) I/F (interface) and/or a common public radio interface (CPRI) I/F. Both standards are commonly used in the industry. The links 70 typically supports greater than 6 Gbps (gigabits per second) data transfer using copper line for short distance or fiber optics for long distances. Each BBU 50 has access to six cells 30 through its immediate neighbors via links 60. Links 60 in an exemplary embodiment can be optical fiber links, and the links use an "RP3-01" physical interface standard that carries the antenna receive (and transmit) signals. Each RRH 40 and cell 30 has two antennas 35: RRH 40-1 has antennas 35-11 and 35-12; RRH 40-2 has antennas 35-21 and 35-22; RRH 40-3 has antennas 35-31 and 35-32; RRH 40-4 has antennas 35-41 and 35-42; RRH 40-5 has antennas 35-51 and 35-52; RRH 40-6 has antennas 35-61 and 35-62; RRH 40-7 has antennas 35-71 and 35-72; and RRH 40-8 has antennas 35-81 and 35-82. The group 20-1, marked as a dashed line ellipse in FIG. 6, has antennas 35-11 through 35-62 and the group 20-2 has antennas 35-31 through 35-82. Each BBU is connected to the links 70 and 60 and also to a backhaul link 80. Backhaul links 80 are connected to core network elements (not shown).

In an example, the cells 30 can be spatially distributed in a stadium (e.g., as shown in FIG. 5). It is noted that a stadium is used herein in the examples, but the instant invention has broader applicability than stadiums. For instance, any time there are cells that are densely packed, for instance, 10 per sq. km (square kilometer) or more, the exemplary embodiments may be used. In stadiums, "densely packed" could be 1000 cells per sq. km or more. In the example of FIG. 6, here is one RRH 40 per cell 30, with two antennas 35 per RRH 40. In the uplink in this example, a receiver uses IRC (interference rejection combining) on information from the "best" eight out of 12 antennas. The eight best antennas may be determined, e.g., by SINR using processing with 4-core DSP (e.g., each core selecting best 2 out of 3) as described herein. The system shown in FIG. 6 may also use 4-way MU-MIMO. In downlink, 2×2 MIMO may be used, and this may evolve to cooperative downlink with joint transmission. In terms of vertical scalability, additional RRHs per BBU 50 may be added.

The UE 110 in this example is attached to cell #3 (30-3) and a signal 71 is sent from the UE 110 using scheduled resources (e.g., scheduled by a scheduler for the RRH 40-3). Versions of the signal 71 are received at each of the cells 30-1 through 30-6 (and also at cells 30-7 and 30-8, although this is not shown in the FIG. 6). In an exemplary embodiment, each BBU 50 "sees" the signal from all of the antennas that are directly or indirectly (over the fiber from the neighbor BBUs) connected to the BBU 50 and is able to use those signals to process using 4-core processing (as described herein) each UE signal. Thus, the cells share the antenna information. This avoids collisions between UEs, because the "colliding" UE signal is known to the receiver and therefore can be "rejected" by the receiver.

Figure 7:
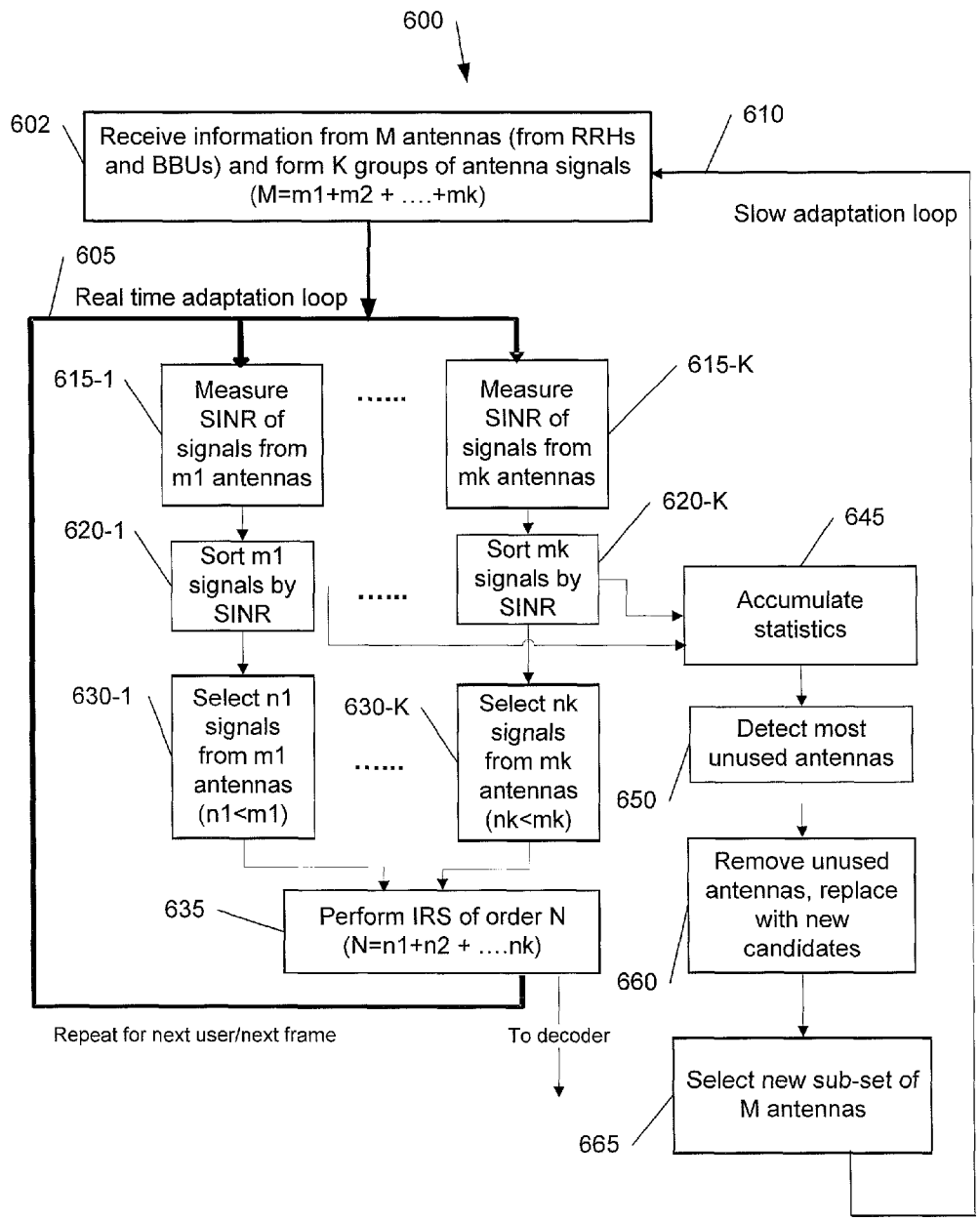
FIG. 7 is a flow chart demonstrating exemplary embodiments of the invention performed by a BBU.

FIG. 7 shows an exemplary flow chart demonstrating implementation of an exemplary method 600 according to embodiments of the invention by a processing device (e.g., BBU). It is noted that the order of steps shown in FIG. 7 is not absolutely required, so in principle, the various steps may be performed out of the illustrated order. Also certain steps may be skipped, different steps may be added or substituted, or selected steps or groups of steps may be performed in a separate application.

The process shown in FIG. 7 may be performed by computer program code (e.g., executed by a processor) or performed by hardware elements, or some combination of these. There are two paths 605 and 610. One path 605 is a real-time adaptation path 605, which is typically performed in fractions of a second (per UE). The other path 610 is a slow adaptation that is performed, e.g., per cell over the course of hours, days, weeks, or months and is for all users, per a cell.

In a method according to the exemplary embodiment shown in FIG. 7, in a first step 600, the processing device such as BBU receives information from M antennas (from RRHs and BBUs directly and indirectly) and forms K groups (m1, m2, . . . , mk) of antenna signals according to exemplary embodiments (e.g., as explained in reference to FIGS. 3 and 4).

In next steps 615-630 the BBU perform multi-core processing of K groups of antenna signals (processing in each group is similar) in a real time adaptation loop 605. For example in step 615-1, the BBU measures the SINR of m1 antenna signals. Other possible approaches may include measuring received signal strength, sounding (SRS, sounding reference signals), and the like, which may be combined with or used in lieu of the SINR.

In a next step 620-1, the BBU sorts m1 signals by the measured SINRs and in a next step 620-1, the BBU selects n1 antenna signals from m1 signals, where n1 is less than m1 (e.g., n1=2, m1=3, selecting best 2 out of 3 signals). Similar processing is performed for each of the K groups (e.g., see steps 615-K to 630-K for the group mk).

In next step 635, the BBU performs IRC of order N, where N=n1+n2+ . . . +nk (e.g., N=8 and M=12) with subsequent output decoding as described herein. Then the process goes back to a real time adaptation loop 605 to repeat the processing procedure for a next frame or a next user. It is noted that signals from different users may be distinguished based on FDM, TDM or CDMA technique.

For the slow adaptation path 610, in step 645, the BBU (e.g., AMU application module) accumulates statistics with inputs from step 620-1, . . . , 620-K as shown in FIG. 7. It is noted that the accumulation of statistics may be performed for all users, for a single cell and/or for M antennas (M>N). In a next step 650, the BBU detects the most unused antennas (e.g., an antenna in an exemplary embodiment is unused if the SINR for all users over a time period is beneath a threshold or one or more other criteria). In a next step 660, the unused antennas are removed from the original set of M antennas and are replaced with new candidate antennas. In one exemplary embodiment, one single antenna (or cell) may be removed. In a system such as the one shown in FIG. 6, there would only be physical connections between neighboring BBUs. So BBU2 would only have a physical link connection to BBU1 and BBU3. However, depending on the cell bandwidth, there may be enough (e.g., fiber) bandwidth in the daisy chained links for, e.g., BBU4 data to also be passed to BBU2. In a next step 665, the BBU selects the new set of M antennas for corresponding tiers.

The FIG. 7 flow chart represents a more generic approach (than that shown in FIG. 6, for instance) that is better suited to an architecture that has, e.g., fiber switches in place. Fiber switches would help remove some of the restrictions that a daisy chain architecture (as shown in FIG. 6) places upon antenna data access. In such a fiber-switched architecture, one could envision the switch connections dynamically updated by the process of blocks 660 and 665. Fiber-switching is merely exemplary and other types of architectures may be used.

Figure 8:
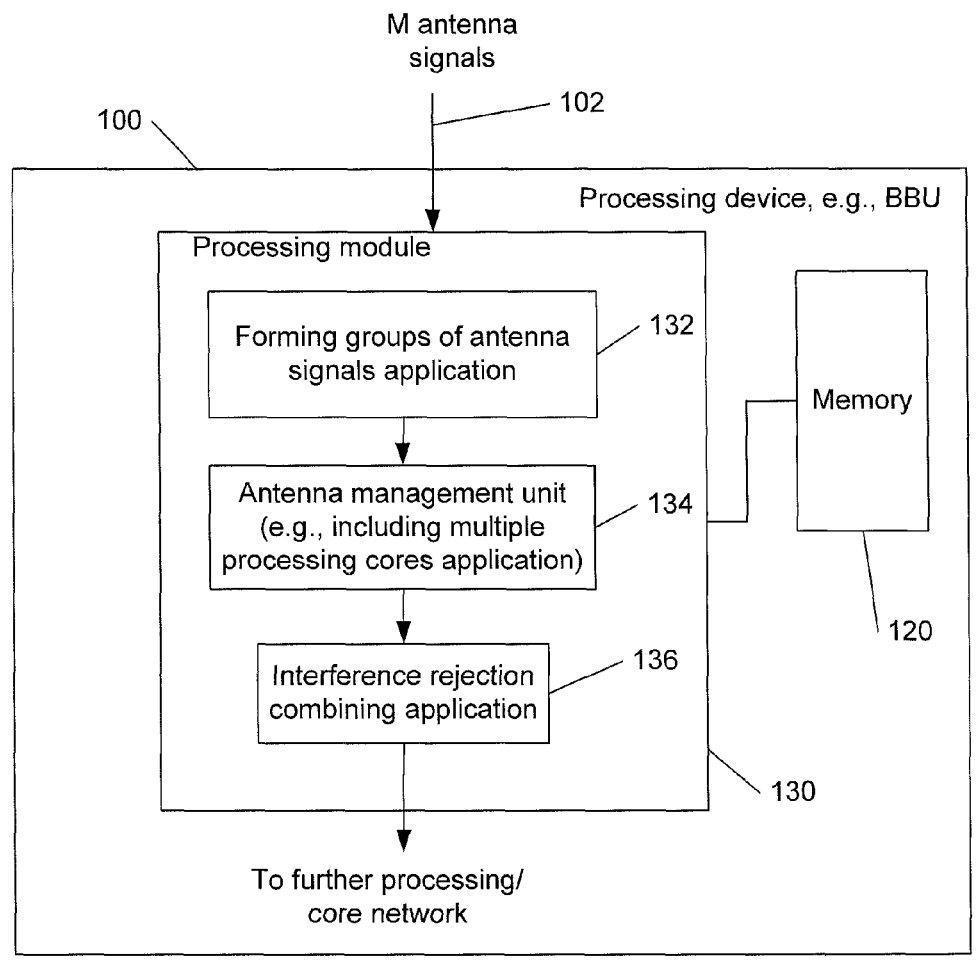
FIG. 8 is a block diagram of a processing device (BBU) for practicing exemplary embodiments of the invention.

FIG. 8 shows an example of a block diagram demonstrating processing device such as BBU 100. FIG. 8 is a simplified block diagram that is suitable for practicing the exemplary embodiments of this invention, and a specific manner in which components of an electronic device are configured to cause that electronic device to operate.

The device 100 may comprise, e.g., at least one processing module 130 and at least one memory 120. Various embodiments of the at least one memory 120 (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 130 and its components may include but are not limited to general purpose computers, special purpose computers, microprocessors, digital signal processors (DSPs) and multi-core processors.

The at least one processing module 130 may provide various instructions for performing steps of the method 600 shown in FIG. 7. The module 130 may be implemented as an application computer program stored in the memory 120, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 130 may be implemented as a separate block or may be combined with any other module/block of the device 100, or it may be split into several blocks according to their functionality. The same is applied to components/applications in the module 130 shown in FIG. 8.

The at least one processing module 130 comprises a forming groups of antenna signals application 132 which receives M antenna signals 102 as illustrated herein in FIGS. 3-7 and forms K groups of antenna signals per embodiments described herein. Further, an antenna management unit (e.g., including multiple processing cores application) 134 performs steps 615 620, 630, 645, 650, 660 and 665 shown in FIG. 7. Moreover, an interference rejection combining application 136 of the processing module 130 performs step 635 shown in FIG. 7.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method comprising:
  receiving by a processing device M signals, each of the M signals being detected by one of M antennas of a plurality of network elements from a user equipment, where each network element has two or more antennas;
  processing by the processing device separately multiple groups of signals formed from the received M signals to select one or more signals in each group by excluding at least one signal from each group, evaluating for each group a signal-to-interference noise ratio for each signal in the group, and selecting the one or more signals in each group having highest signal-to-interference noise ratios for signals in the group, wherein each group of the multiple groups comprises two or more signals of the M signals; and
  combining by the processing device all selected signals from the multiple groups of signals to represent a signal transmitted by the user equipment.

2. The method of claim 1, where said combining is performed using interference rejection combining.

3. The method of claim 1, wherein:
  the method further comprises, after receiving the M signals, separating by the processing device, based on a predefined criterion, the M signals into the multiple groups of signals m1, m2, . . . , mk, where a number of the multiple groups equals k; and the processing and combining are performed using the k multiple groups.

4. The method of claim 1, wherein the plurality of network elements comprises six network elements.

5. The method of claim 1, wherein the plurality of network elements comprises six remote radio heads, each representing a cell in a wireless network.

6. The method of claim 1, wherein M=12 and each group has three signals, and the selected signals in each group are two signals.

7. The method of claim 1, wherein the plurality of the network elements are divided into several tiers so that signals from different tiers are processed in different groups.

8. The method of claim 1, wherein signals from the two or more antennas of each network element are not perfectly correlated and are processed in different groups of signals.

9. The method of claim 1, wherein the processing device is a baseband unit.

10. The method of claim 1, wherein selected signals of the M signals are received from selected network elements of the plurality of network elements directly, and further selected signals of the M signals are received from further selected network elements of the plurality of network elements indirectly through further processing devices.

11. An apparatus comprising:
a processing system comprising at least one processor and a memory storing a set of computer instructions, in which the processing system is arranged to cause the apparatus to:
receive M signals, each of the M signals being detected by one of M antennas of a plurality of network elements from a user equipment, where each network element has two or more antennas;
process separately multiple groups of signals formed from the received M signals to select one or more signals in each group by excluding at least one signal from each group, evaluate a signal-to-interference noise ratio for each signal in the group, and select the one or more signals in each group having highest signal-to-interference noise ratios for signals in the group, wherein each group of the multiple groups comprises two or more signals of the M signals; and
combine all selected signals from the multiple groups of signals to represent a signal transmitted by the user equipment.

12. The apparatus of claim 11, where said combining is performed using interference rejection combining.

13. The apparatus of claim 11, wherein:
the processing system is arranged to cause the apparatus, after receiving the M signals, to separate, based on a predefined criterion, the M signals into the multiple groups of signals m1, m2, ..., mk, where a number of the multiple groups equals k; and
the processing and combining are performed using the k multiple groups.

14. An apparatus comprising:
a processing system comprising at least one processor and a memory storing a set of computer instructions, in which the processing system is arranged to cause the apparatus to:
receive M signals, each of the M signals being detected by one of M antennas of a plurality of network elements from a user equipment, where each network element has two or more antennas and where the plurality of network elements comprises six remote radio heads, each representing a cell in a wireless network;
process separately multiple groups of signals from the received M signals to select one or more signals in each group by excluding at least one signal from each group, wherein each group of the multiple groups comprises two or more signals of the M signals; and
combine all selected signals from the multiple groups of signals to represent a signal transmitted by the user equipment.

15. An apparatus comprising:
a processing system comprising at least one processor and a memory storing a set of computer instructions, in which the processing system is arranged to cause the apparatus to:
receive M signals, each of the M signals being detected by one of M antennas of a plurality of network elements from a user equipment, where each network element has two or more antennas and where M=12 and each group has three signals, and the selected signals in each group are two signals;
process separately multiple groups of signals formed from the received M signals to select one or more signals in each group by excluding at least one signal from each group, wherein each group of the multiple groups comprises two or more signals of the M signals; and
combine all selected signals from the multiple groups of signals to represent a signal transmitted by the user equipment.

16. The apparatus of claim 11, wherein the plurality of the network elements are divided into several tiers so that signals from different tiers are processed in different groups.

17. The apparatus of claim 11, wherein signals from the two or more antennas of each network element are not perfectly correlated and are processed in different groups of signals.

18. The apparatus of claim 11, wherein the apparatus comprises a baseband unit.

19. The apparatus of claim 11, wherein the at least one processor is configured to process the multiple groups of signals using multi-core processing with each core processing one corresponding group.

20. The method of claim 1, wherein there are six cells having two antennas per group, and a selection of a sub-group of N=8 out of a cluster of M=12 antennas is performed in real time per user.

21. The apparatus of claim 14, wherein there are six cells having two antennas per group, and a selection of a sub-group of N=8 out of a cluster of M=12 antennas is performed in real time per user.

* * * * *